(12) United States Patent
Kschier

(10) Patent No.: US 6,457,383 B1
(45) Date of Patent: Oct. 1, 2002

(54) ROTATING OR SWIVELING DEVICE OF A MACHINE TOOL

(75) Inventor: Uwe Kschier, Füssen (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 29 days.

(21) Appl. No.: 09/670,976

(22) Filed: Sep. 27, 2000

(30) Foreign Application Priority Data

Sep. 28, 1999 (DE) .......................................... 199 46 424

(51) Int. Cl.⁷ ............................................... B23Q 16/00
(52) U.S. Cl. .......................................... 74/824; 409/220
(58) Field of Search .......................... 74/813 R, 813 L, 74/813 C, 814, 824, 826; 409/219, 220, 224; 403/374.1, 374.2

(56) References Cited

U.S. PATENT DOCUMENTS

| | | | | |
|---|---|---|---|---|
| 3,786,721 A | * | 1/1974 | Reda .......................... | 409/165 |
| 4,108,024 A | * | 8/1978 | Ditzel et al. ............... | 74/813 L |
| 4,380,939 A | * | 4/1983 | Cardner ....................... | 74/813 |
| 5,542,317 A | * | 8/1996 | Carter et al. ............... | 74/813 L |
| 5,918,510 A | * | 7/1999 | Uemura et al. ........... | 74/813 L |
| 6,185,802 B1 | * | 2/2001 | Gruber et al. .............. | 29/38 R |

* cited by examiner

Primary Examiner—David A. Bucci
Assistant Examiner—Timothy McAnulty
(74) Attorney, Agent, or Firm—The Maxham Firm

(57) ABSTRACT

A rotating or swiveling device of a machine tool, in particular an NC circular milling attachment, with a machine component on bearings which can be rotated or swivelled, and a clamping device for the releasable fixing of the machine component in the desired angled positions. A secure fixing of the rotating or swiveling machine component can, according to the present invention, also be achieved, even without a change of position, through the fact that the clamping device has a clamping component with laterally flexible clamping elements arranged on the support for gripping into a ring groove on the machine component and a pressure component which can be moved against the clamping component to press the clamping elements against at least one side wall of the ring groove.

13 Claims, 3 Drawing Sheets

ROTATING OR SWIVELING DEVICE OF A MACHINE TOOL

BACKGROUND

1. Field of the Invention

The invention concerns a rotating or swiveling device, in particular an NC circular milling attachment with a machine component on bearings on a support and able to rotate or swivel on bearings, and a clamping device for releasable fixing of the machine part in desired angled positions.

2. Discussion of Related Art

In order to carry out multi-axle machining in a single clamping cycle, multiple numerically-controlled circular milling attachments, which are able to turn and swivel, are fitted in modern machining centers and in universal milling and drilling machines. In this way it is, for example, possible to carry out in a single clamping using the controlled linear axles of the machine as well as the swiveling and rotating axle of an NC circular milling attachment, a five-axle machining cycle of workpieces of even complex shape, where time and precision losses due to repeated reclamping of workpieces are avoided. For the performance of certain machining operations, rotating and swiveling circular milling attachments must nevertheless be able to be fixed in desired rotating or angled positions. This can be carried out, for example, via the position control of the driving motors for the swiveling or turning movement of the milling attachment. In so doing it is, however, necessary for the driving motors to furnish a relatively high retention moment, so that the milling attachment is protected from distortion, notwithstanding the potentially high forces which occur, for example, in roughing-down machining. For this purpose, it is, as a rule, necessary for the driving motors to be commensurately large.

For this reason, rotating and swiveling tables have in the past been proposed, where a milling attachment able to run on bearings on a console is drawn against the console by means of a separate clamping device, to give protection against distortion. For this purpose, hydraulically adjustable tension elements were introduced which grip into a T-shaped ring groove on the underside of the table top and draw the latter with its underside against a corresponding opposite face of the console in order to ensure secure fixing which is protected from distortion. The drawback of this solution is the fact that owing to having been drawn against the console, the table top is lowered and possibly also deformed, which can lead to a loss of machining precision. Moreover, every time the table top is drawn against the console, the milling attachment bearing also comes under appreciable stress which can lead to the appearance of symptoms of premature wear.

SUMMARY OF THE INVENTION

It is a primary purpose of the present invention to create a rotating or swiveling device of the type described earlier, which makes possible the secure fixing of the rotating or swiveling machine component without a change of position.

This purpose is accomplished by the device according to the invention through the clamping device having a clamping component arranged on the support with laterally flexible clamping elements for gripping a ring groove on the rotating or swiveling machine component and a pressure component able to move against the clamping component for pressing the clamping elements against at least one side wall of the ring groove.

In the case of the rotating and swiveling device according to the present invention, the clamping of the machine component on bearings on a support so as to be able to rotate or swivel takes place solely through radial clamping forces which do not result in any drawing of the machine component to the support. In the case of a horizontal table top, it is, for example, possible to avoid, by means of radial clamping, a lowering or a deformation of the milling attachment and the resulting lack of machining precision.

Thus, a particularly advantageous embodiment of the clamping component is a clamping ring which can be fastened on the support by means of inner and outer clamping elements which are regularly distributed over its circumference and which are able to be pressed against the inner and outer side wall of the ring groove. The radial forces acting on the inner and outer side wall of the ring groove cancel out one another, so that in clamping, no lateral displacement of the rotating or swiveling machine component with respect to the support takes place.

In a further advantageous embodiment of the invention, it is also possible to achieve an even pressure over a larger area through the fact that the clamping elements are ring segments which exhibit flexibility in radial directions.

In a still further advantageous embodiment of the invention, the pressure component has the shape of a conical ring with conical pressure faces arranged between the inner and outer clamping elements. Through the wedge- and cone-shaped pressure component, it is possible to achieve an increase of the radial tension forces.

The ring groove and the associated clamping component are advantageously arranged in the area of the outer circumference of the rotating or swiveling machine component. In this way, it is possible to achieve a relatively high retention moment even by means of relatively low clamping forces.

In a readily controllable embodiment, the axial displacement of the pressure component takes place through a pressure medium actuated piston cylinder device which contains, for example, several hydraulic cylinders regularly distributed over the circumference. The pressure component can, however, also be displaced by means of other suitable actuating devices.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
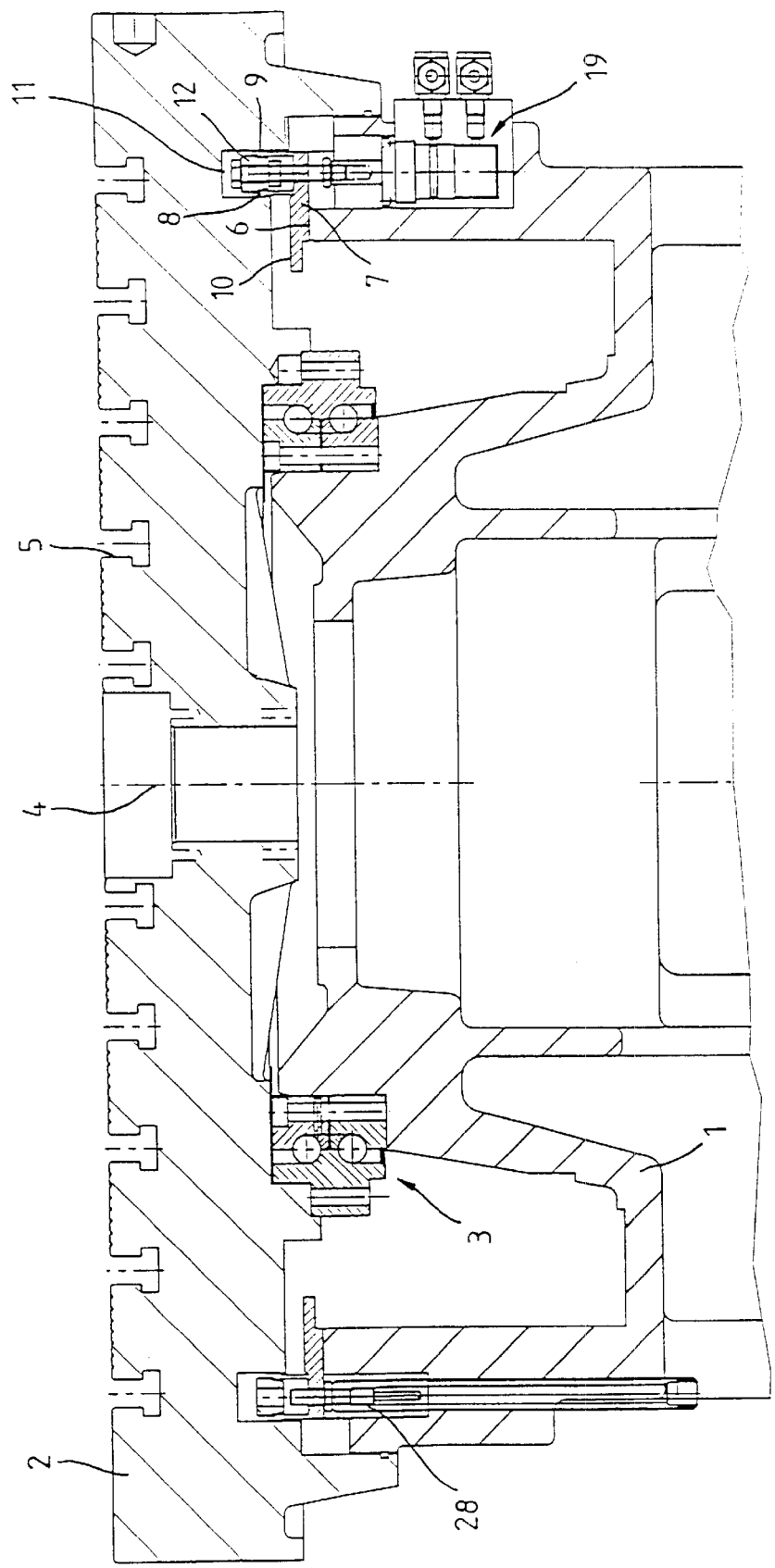
FIG. 1 is a partial sectional view of an NC circular milling attachment of a machine toot with a section through a clamping device in accordance with the invention.

The NC circular milling attachment of a universal milling and drilling machine shown schematically in FIG. 1 contains, for example, support 1 in the form of a table saddle or a console, on which table top 2 is arranged on bearings via an arrangement of bearings 3 in the form of an axial angular ball-bearing which can be rotated about vertical rotation axis 4. Table 2 has on its upper face several T-shaped tension ridges 5 for the clamping of workpieces. The table can also be fitted with threaded insert nuts for clamping workpieces. The rotational drive of table 2 can also take place via a driving motor not shown in FIG. 1, arranged inside support 1.

Figure 2:
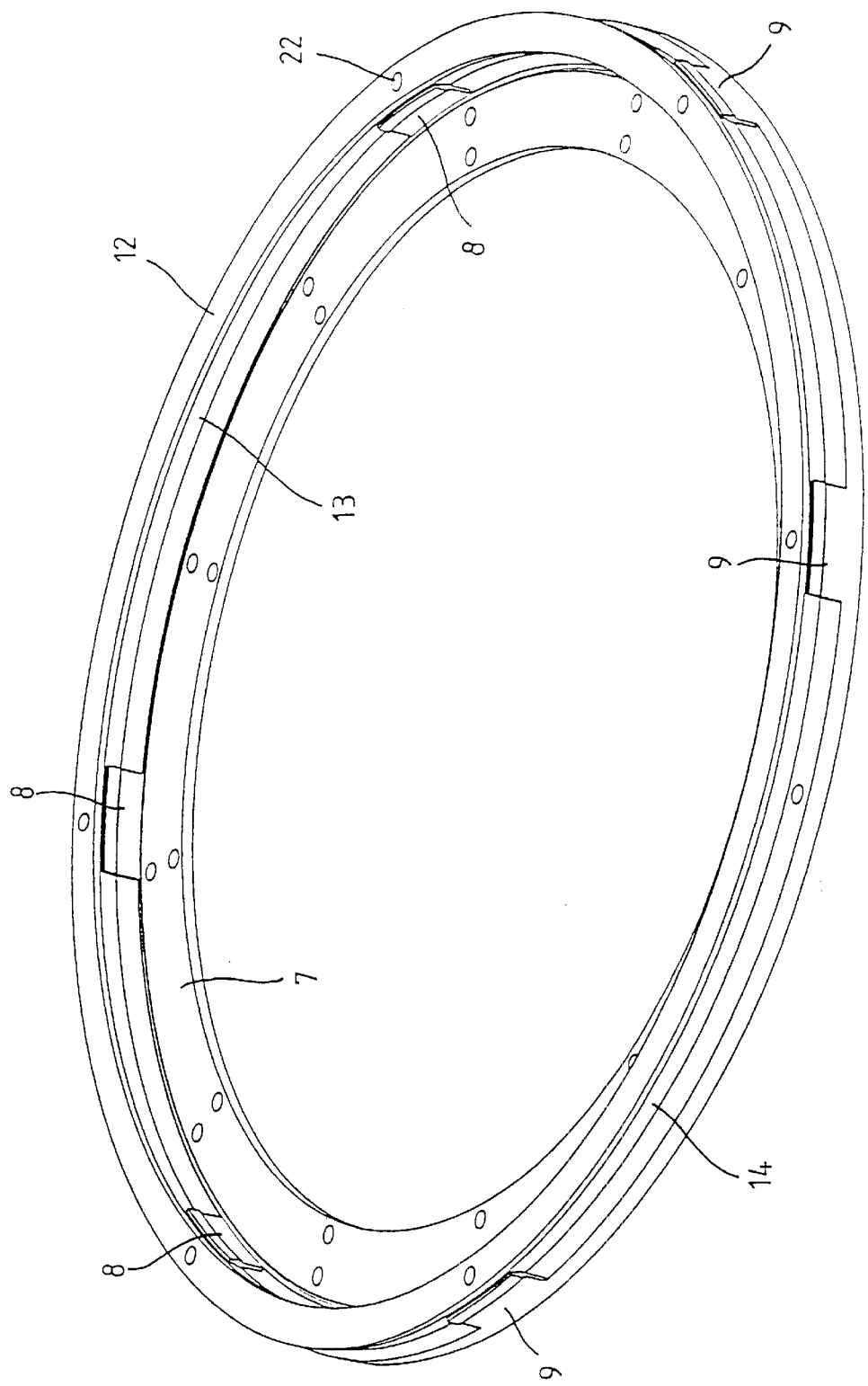
FIG. 2 is a perspective view of a clamping- and counter-ring of the clamping device shown in FIG. 1.

As can be seen from FIG. 1, support 1 contains an outer ring concentric with rotation axis 4 on which is fastened clamping ring 7 (shown in perspective in FIG. 2), which has several clamping components regularly distributed over its circumference in the form of inner and outer ring segments 8 and 9, which are arranged at circumferential distances in pairs opposite one another and which exhibit flexibility in the radial direction. The relatively thin-walled ring segments 8 and 9 are formed on and project from upper ring surface 10 of clamping ring 7 in the axial direction and grip into a ring groove arranged concentrically to rotation axis 4 on the underside of table 2. Between the six inner and outer ring segments 8 and 9 there is arranged conical pressure ring 12 with inclined inner and outer conical faces 13 and 14 opposite one another for pressing the radially flexible ring segments 8 and 9 against the side walls of ring groove 11, which is coaxial with the clamping ring 7 and can be moved in an axial direction.

Figure 3:
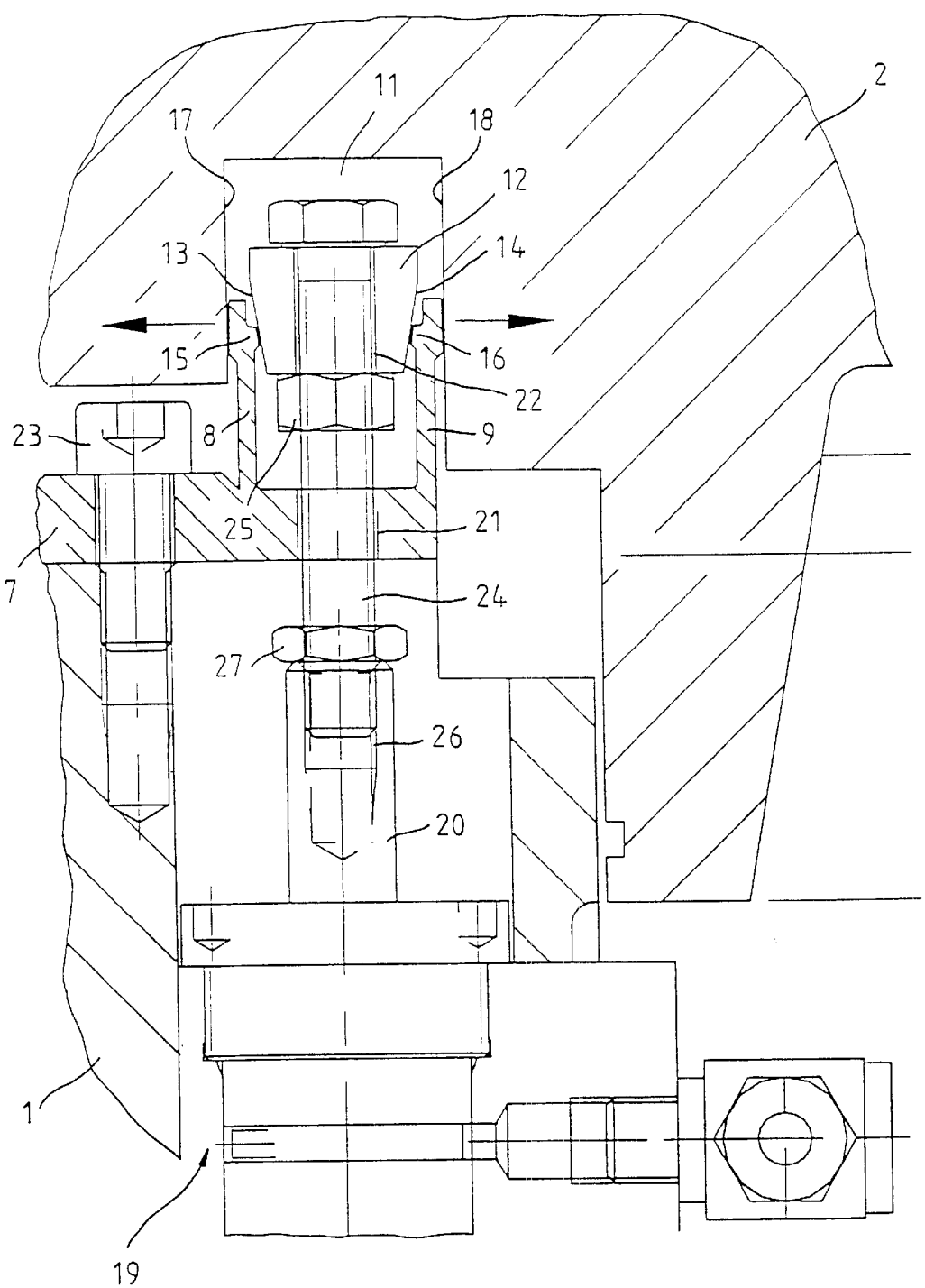
FIG. 3 is a partial sectional view of a section through the clamping device of FIG. 1.

As can be seen more particularly from FIG. 3, pressure ring 12 has, in the area of conical faces 13 and 14, an outside diameter which is continuously increasing in the direction of its upper face and a correspondingly decreasing inner diameter. With its inner and outer conical faces 13 and 14, pressure ring 12 bears on corresponding projections 15, 16 on the inner faces of inner and outer ring segments 8 and 9, in such a way that the relatively thin-walled ring elements 8 and 9, which exhibit flexibility in the radial direction, are pressed during axial displacement of pressure ring 12 against inner and outer side walls 17, 18 of the ring groove 11, as indicated by an arrow. In this way, a frictionally actuated connection is achieved between support 1 and table 2, which prevents the deformation of the table. In the event of an axial displacement of pressure ring 12 away from clamping ring 7, the ring elements will automatically return to their starting position in which there is little friction or play between the ring components and the side walls of the ring groove.

In support 1, for the purpose of axial movement of pressure ring 12, six hydraulic cylinders 19 are arranged regularly and circumferentially equidistantly, only one of which is shown on the right-hand side of FIG. 1 and in FIG. 3. Hydraulic cylinders 19 are, as shown in FIG. 3, arranged in such a way that their piston rods 20 are provided in each case with a through-drilled opening 21 in clamping ring 7 between ring segments 8 and 9, and a corresponding through-drilled opening 22 in pressure ring 12, which openings are in alignment. Through the through-drilled opening 21 in clamping ring 7, which is fixed to support 1 by means of screws 23, are passed threaded bolts 24, whose upper portion is fixed by nut 25 to pressure ring 12 and whose lower portion is screwed into threaded hole 26 in piston rod 20 and secured by locknut 27.

By means of appropriately moving hydraulic cylinder 19, pressure ring 12 can be moved into a lower clamped position in which it presses ring segments 8 and 9 against inner and outer walls 17, 18 of ring groove 11. The pressure ring can also be moved, via hydraulic cylinder 19, into an upper releasable position, when flexible ring segments 8, 9 return to their unclamped starting positions.

FIG. 1 shows on the left-hand side in support 1 a limit switch 28 which is actuated when pressure ring 12 is drawn on the support. This enables a check to be made on whether pressure ring 12 is in the clamped or in the released position.

The present invention is not limited to the example set out in the description and shown in the figures. For example, the clamping device can also be used for the releasable fixing of a swiveling milling head or of other rotating or swiveling devices of a machine tool.

What is claimed is:

1. A rotating or swiveling device of a machine tool, in particular of a NC circular milling attachment, the device having a support and comprising:

a machine component having a ring groove and being mounted on rotating or swiveling bearings;

a clamping device for the releasable fixing of the machine component in a desired angle position, the clamping device having a clamping component arranged on the support with laterally flexible clamping elements for gripping into the ring groove on the machine component, the ring groove having inner and outer walls, and the clamping device having a pressure component movable opposite the clamping component for pressing the clamping elements against at least one side wall of the ring groove, wherein the clamping component is a clamping ring connectable to the support provided with inner and outer clamping elements which are regularly distributed over its circumference and which are configured to be pressed by the pressure component against the inner and outer walls of the ring groove.

2. The device according to claim 1, wherein the clamping elements are ring elements which exhibit elasticity in the radial direction.

3. The device according to claim 1, wherein the pressure component is a pressure ring arranged between the inner and outer clamping elements with conical side faces.

4. The device according to claim 2, wherein the pressure component is a pressure ring arranged between the inner and outer clamping elements with conical side faces.

5. The device according to one of claims 1 or 3, wherein the ring groove and the clamping component are arranged in the area of the outer circumference of the rotating or swiveling machine component.

6. The device according to claim 2, wherein the ring groove and the clamping component are arranged in the area of the outer circumference of the rotating or swiveling machine component.

7. The device according to one of claims 1 or 3, and further comprising a pressure medium actuated piston cylinder arrangement, wherein the pressure component is configured to be moved in an axial direction by means of said piston cylinder.

8. The device according to claim 2, and further comprising a pressure medium actuated piston cylinder arrangement wherein the pressure component is configured to be moved in an axial direction by means of said piston cylinder.

9. The device according to claim 5, and further comprising a pressure medium actuated piston cylinder arrangement wherein the pressure component is configured to be moved in an axial direction by means of said piston cylinder.

10. The device according to one of claims 1 or 3, and further comprising a device for monitoring the clamped or released position of the pressure part, said device being arranged in the support.

11. The device according to claim 2, and further comprising a device for monitoring the clamped or released position of the pressure part, said device being arranged in the support.

12. The device according to claim 5, and further comprising a device for monitoring the clamped or released position of the pressure part, said device being arranged in the support.

13. The device according to claim 7, and further comprising a device for monitoring the clamped or released position of the pressure part, said device being arranged in the support.

* * * * *